United States Patent
Rakoff et al.

(10) Patent No.: US 7,810,734 B2
(45) Date of Patent: Oct. 12, 2010

(54) ANTI-SKIMMING CARD READER SURFACE CONFIGURATION

(75) Inventors: Steven Barnett Rakoff, Toronto (CA); Ronald Arthur Flook, Burlington (CA); David Tam, Mississauga (CA)

(73) Assignee: UTC Fire & Security Corporation, Farmington, CT (US)

( * ) Notice: Subject to any disclaimer, the term of this patent is extended or adjusted under 35 U.S.C. 154(b) by 1013 days.

(21) Appl. No.: 11/568,647

(22) PCT Filed: May 3, 2005

(86) PCT No.: PCT/US2005/015232
§ 371 (c)(1),
(2), (4) Date: Nov. 3, 2006

(87) PCT Pub. No.: WO2005/109326
PCT Pub. Date: Nov. 17, 2005

(65) Prior Publication Data
US 2007/0228178 A1    Oct. 4, 2007

(51) Int. Cl.
*G06K 13/00* (2006.01)
(52) U.S. Cl. .................. 235/475; 235/382; 235/379
(58) Field of Classification Search ............ 235/382, 235/382.5, 380, 379, 375, 487, 475
See application file for complete search history.

(56) References Cited

U.S. PATENT DOCUMENTS

| | | | |
|---|---|---|---|
| 5,760,380 | A | 6/1998 | May |
| 5,949,048 | A | 9/1999 | Nakamura et al. |
| 6,176,426 | B1 | 1/2001 | Kanayama et al. |
| 6,464,143 | B2 | 10/2002 | Oki et al. |
| 6,641,035 | B1 | 11/2003 | Predescu et al. |
| 2004/0129772 | A1 | 7/2004 | Ramachandran et al. |

FOREIGN PATENT DOCUMENTS

| | | |
|---|---|---|
| DE | 9101306 U1 | 5/1991 |
| DE | 29604598 U1 | 7/1996 |
| DE | 19959459 A1 | 6/2001 |
| EP | 1096438 A2 | 5/2001 |

(Continued)

OTHER PUBLICATIONS

Wincor Nixforf: "Highlights Newsletter—Wincor Vision" Internet Citation, Mar. 31, 2003, XP002346367 Retrieved from the Internet: URL:http://www.wincor-nixdorf.com/interneet/ch/WincorVisioiArchiv/WincorVision0303PDF.

(Continued)

*Primary Examiner*—Karl D. Frech
(74) *Attorney, Agent, or Firm*—Carlson, Gaskey & Olds PC

(57) ABSTRACT

A card reader housing (20) has an exterior surface configuration (22) that includes a plurality of distinct surface portions (24-38) aligned at oblique angles relative to each other. The exterior surface configuration (22) prevents the placement of a skimming reader over the top of the card reader housing (20). In a disclosed example, a finger-receiving notch (50) is directly aligned with a reader (60) and has a depth and a dimension sized for receiving at least a portion of a finger holding a card inserted into a slot (46) in the housing (20). Any alteration of the notch (50) dimensions prevents proper operation of the card reader.

17 Claims, 2 Drawing Sheets

FOREIGN PATENT DOCUMENTS

EP    1505549 A1    2/2005

OTHER PUBLICATIONS

Supplementary European Search Report for Application No. EP 05 74 3335 dated Jan. 27, 2009.

International Search Report for International Application No. PCT/US05/15232 dated Sep. 2, 2005.

Written Opinion of the International Searching Authority for International Application No. PCT/US05/15232 dated Sep. 2, 2005.

International Preliminary Examination Report for International Application No. PCT/US05/15232 mailed Sep. 27, 2006.

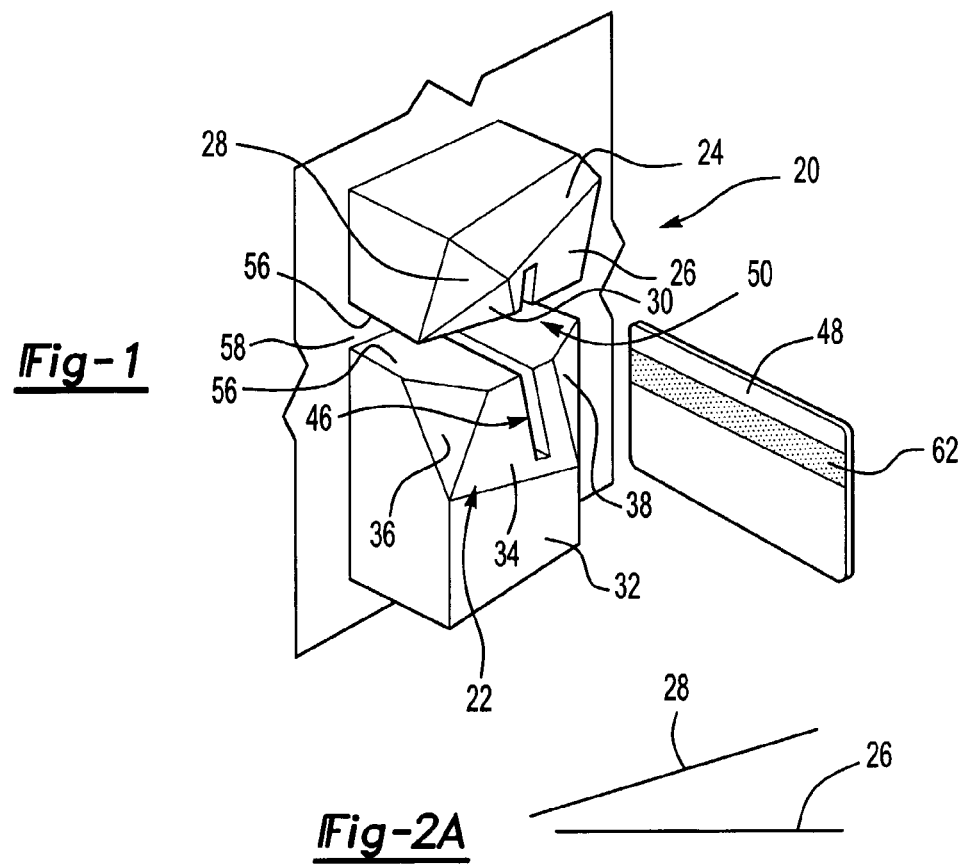
*Fig-1*
*Fig-2A*
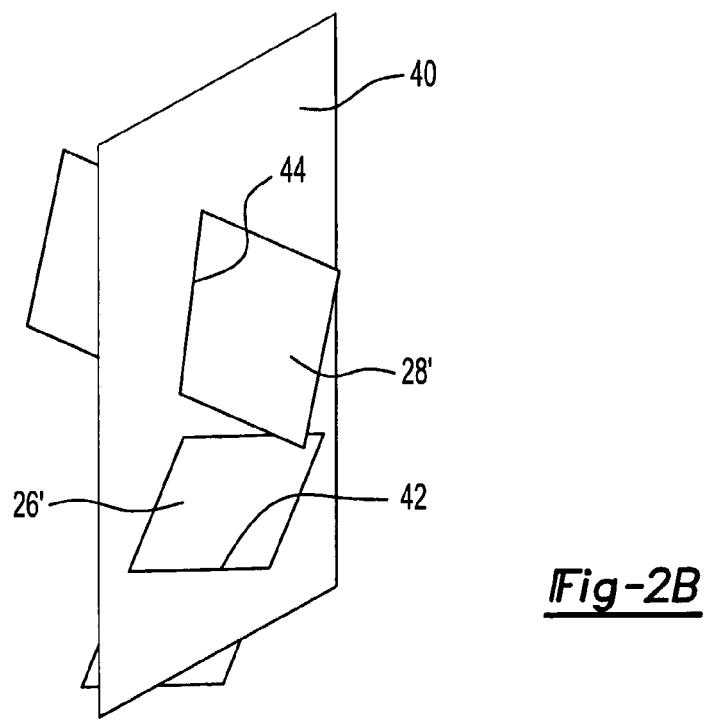
*Fig-2B*

ANTI-SKIMMING CARD READER SURFACE CONFIGURATION

FIELD OF THE INVENTION

This invention generally relates to card reader security. More particularly, this invention relates to preventing placing a skimming reader over a card reader.

BACKGROUND OF THE INVENTION

Automated teller machines (ATMs) have become well known and widely used. ATMs allow individuals twenty-four hour access to their bank accounts to conduct a number of transactions. One advantage to ATMs is their convenience to bank customers. Another advantage is the ability for banks to have transactions automated, which presents a cost savings to the bank.

One feature of ATMs is that they require a sufficient amount of information regarding a bank customer before allowing a transaction to be completed. The conventional way of providing such information to the ATM is by inserting a card that includes a magnetic strip containing customer information. Following that, the customer enters a personal identification number and gains access to their account(s). Some buildings include a vestibule housing the ATM. When the bank is closed, the vestibule is locked. A customer can temporarily unlock the door by inserting their ATM card in a reader near the door to the vestibule.

Maintaining customer account and access information confidential and secure has recently become problematic. Skimming readers have been developed that are placed over a card reader slot on an ATM or the card reader for entering the vestibule. These skimming readers read the magnetic strip on the card as a bank customer inserts their card for purposes of conducting a transaction with the bank. The skimming reader scans the magnetic strips and gathers the information regarding each individual and their account.

By using a hidden camera or a secretly located individual, the customer's access code (i.e., a manually entered PIN) can be gathered. That information combined with the information gathered by the skimming reader allows an unauthorized individual to gain unauthorized access to the individual's bank account or accounts and make illegal fund withdrawals.

There is a need for protecting against someone placing a skimming reader over the card reader associated with the ATM or the vestibule entry. This invention addresses that need.

SUMMARY OF THE INVENTION

This invention provides a card reader configuration that reduces or eliminates the possibility for someone to place a skimming reader over the card reader in a successful manner. With a disclosed example, even if a skimming reader is successfully placed over the card reader, the presence of the skimming reader will be readily visible apparent or it will interfere with the ability for the card reader to operate properly. Under either scenario, the skimming reader will be detectable, which prevents unauthorized access to personal information.

An exemplary disclosed card reading device includes a housing having a slot for receiving the card and an asymmetric exterior surface near the slot that includes a plurality of distinct surface portions aligned at oblique angles to each other.

In one example, the plurality of distinct surface portions are aligned at at least three different oblique angles relative to each other. In one example, each distinct surface portion is at least partially flat.

One disclosed example includes a notch in the housing that has a depth beyond a reference plane and a dimension for receiving at least a portion of a finger. The slot in this example is at least partially within the housing for receiving a card and has a first portion aligned with the notch and a second portion adjacent to the notch. With this example, when a card is inserted within the slot, some of the card is covered by the second portion of the slot and another portion of the card is aligned with the first portion of the slot and the notch such that it is accessible from outside of the housing. The configuration of the notch in one example effectively prevents a skimming reader from being unnoticeably positioned near a reader portion of the device.

The various features and advantages of this invention will become apparent to those skilled in the art from the following detailed description. The drawings that accompany the detailed description can be briefly described as follows.

BRIEF DESCRIPTION OF THE DRAWINGS

FIG. 1 schematically shows an example card reader housing designed according to one embodiment of this invention.

FIGS. 2A and 2B schematically show an example feature of the exterior surface configuration of the card reader housing of FIG. 1.

DETAILED DESCRIPTION

FIG. 1 schematically shows a portion of a card reader housing 20 having an exterior surface configuration 22 that is designed in a unique manner to prevent the placement of a skimming reader over the top of the card reader housing 20. The example exterior surface configuration 22 is non-continuous and asymmetric. The illustrated example surface configuration 22 is non-continuous because it includes various portions at different angles with visible transition points between the various portions. In other words, the non-continuous surface configuration 22 includes a plurality of distinct surface portions. The illustrated example is asymmetric because there is an unbalanced distribution and alignment of the various portions across the surface configuration. The right half is not a mirror image of the left half, for example.

The example configuration includes a plurality of at least partially flat surface portions 24, 26, 28, 30, 32, 34, 36 and 38, at various oblique angles relative to each other. Having the plurality of surface portions 24-38 at various, different angles makes it difficult, if not impossible, for a skimming reader to be designed to readily fit over the card reader housing 20 in a manner that it cannot be easily detected. In some examples, any attempt to place a skimming reader on top of the card reader housing 20 will fail absent significant efforts or techniques. Further, any appended skimming reader likely will be easily detected by someone attempting to properly use the card reader after the skimming reader is in place.

Figure 3:
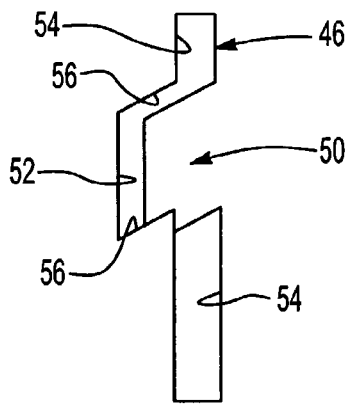
FIG. 3 schematically shows a feature of a slot in the example housing.

As can best be appreciated from FIGS. 2 and 3, various surface angles can be used at various portions of the exterior surface configuration 22. In the illustrated example, the surface portion 26 is aligned transverse to the surface portion 28. Having an intentionally non-continuous and asymmetric surface configuration 22 is enough to prevent someone from attaching a skimming reader in most situations.

FIGS. 2A and 2B schematically show geometric relationships between selected portions of the exterior configuration 22. FIGS. 2A and 2B show the angular relationships between the surface portions 26 and 28. As can be appreciated from FIG. 2A, the surface portion 28 is at an oblique angle relative to the surface portion 26. As can be appreciated from FIG. 2B, a plane 28' parallel to the surface portion 28 is at an oblique angle relative to a reference plane 40. A plane 26' parallel to the surface portion 26 is also oriented at an oblique angle relative to the reference plane 40. The respective angles of the planes 26 and 28 relative to the reference plane 40 are different.

Additionally, the orientation of the planes 26' and 28' relative to the reference plane 40 are different. The plane 26', for example, effectively intersects the reference plane 40 along a line 42, which is generally horizontal in the illustration. The plane 28' intersects the reference plane 40 along a line 44, which is generally vertical in the illustration. The lines 42 and 44 are arranged transverse to each other. In one example, the lines 42 and 44 are perpendicular to each other.

FIG. 2B schematically shows how various surface portions of the exterior configuration 22 can be arranged at a variety of different angles to provide an asymmetric or non-continuous exterior surface configuration 22, which does not lend itself to a skimming reader being secured over top of the housing. A relatively complicated exterior configuration 22 would require an individual to expend substantial effort to design a skimming reader that would be able to fit over the exterior configuration 22 in a manner that would not be readily, visually apparent.

As can be appreciated from FIGS. 1 and 3, the example housing 20 includes a slot 46 for receiving a card 48 such as an ATM banking card. Another feature of the example embodiment is that a finger-receiving notch 50 is associated with the card slot 46. The card slot 46 in this example includes a first portion 52 and a second portion 54. The first portion 52 of the card slot 46 is directly aligned with the finger-receiving notch 50 and the second portion 54 is adjacent to the finger-receiving notch 40.

The notch 50 in this example has a dimension corresponding to an average width of an individual's finger. As best appreciated from FIGS. 3 and 4, two surfaces 56 are spaced apart to define a width of the notch (which extends in a vertical direction in the drawings). Another surface 58 defines a depth of the notch from a reference plane 59 associated with the exterior configuration 22 of the housing 20. The reference plane 59 is positioned perpendicular to the card 48 when the card is received within the card slot 46. The finger-receiving notch 50 includes a width dimension that generally corresponds to an average finger width.

Figure 4:
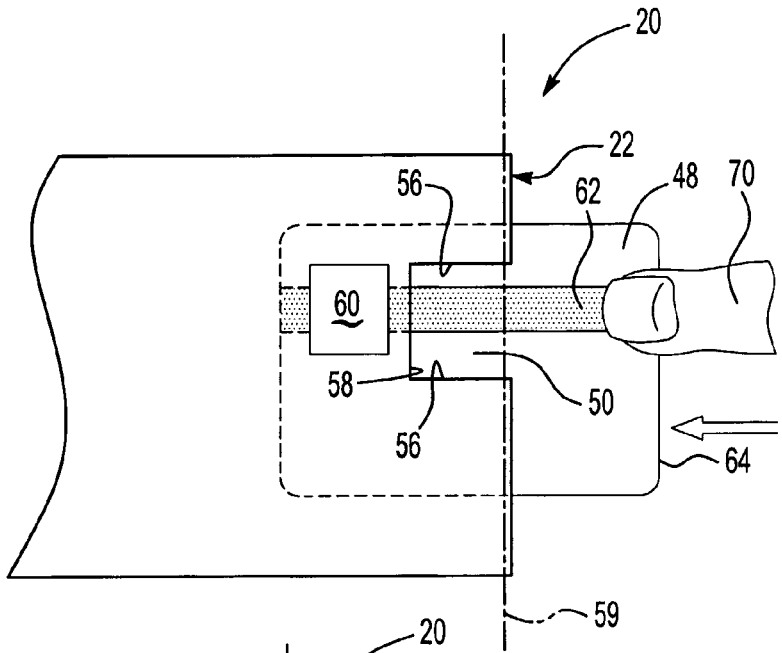
FIG. 4 schematically shows an operational feature of an example housing configuration.

Referring to FIG. 4, an electronic reader 60 according to one example is disposed within the card reader housing 20. The electronic reader 60 is aligned with the notch 50. The electronic reader 60 reads a magnetic strip 62 on the card 48 in a known manner. The reader 60 detects a partial read resulting from a partial insertion of the card 48 into the slot 46 in a known manner.

Figure 5:
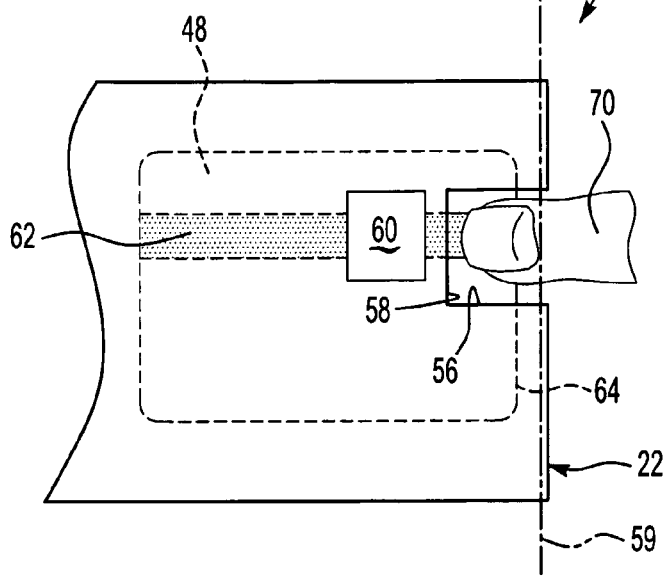
FIG. 5 schematically shows the feature of FIG. 4 with a card in a fully inserted position.

In the illustrated example as shown in FIGS. 4 and 5, full insertion of the card 48 is achieved when a trailing edge 64 of the card 48 passes the reference plane 59 a sufficient distance for the reader 60 to obtain a full or complete read of the strip 62. At least a portion of a finger 70 must be received within the finger-receiving notch 50 for this to occur.

In this example, the dimension of the notch 50 (and particularly the spacing between the surfaces 56) is arranged to allow the average human finger 70 to fit within the notch 50 during card insertion. If an individual attempted to attach a skimming reader to the housing 20 in a manner that would reduce the spacing between the surfaces 56, the typical finger would not be able to be received within the notch and the card 48 could not be fully inserted into the slot 46. Under these circumstances, the reader 60 will detect a partial read. In some examples, the reader 60 provides an alert indication whenever a number of partial reads exceeding a selected threshold occurs within a selected period of time. A number of partial reads, for example, may provide an indication that some alteration to the housing 20 has been made, which may provide an early alert that a skimming reader has been attached to the housing 20. By restricting the dimensions of the notch 50, the illustrated example make it even more difficult for the attachment of a skimming reader.

It is not possible to fully insert the card 48 without having unhindered access to the slot 50 because some of the card 48 is completely covered by the second portion 54 of the slot 46 when the card is fully inserted as shown in FIG. 5, for example. Another portion of the card 48 is accessible within the notch 50 from outside of the housing 20. Only the latter portion of the card is accessible when the card 48 is fully inserted in the slot 46 to achieve a complete read by the reader 60. Accordingly, any modification to the slot 50 will hinder an individual's ability to properly insert their card into the slot 46.

As can be appreciated from FIGS. 4 and 5, the strategic alignment of the finger-receiving notch 50 and the electronic reader 60 further prevents the attachment of a skimming reader because any increased surface thickness in the area of the surface 58 that would be introduced if a skimming reader were attached on or in front of the surface 58 will prevent full insertion of the card 48. Any reduction in the depth of the notch 50 will prevent a complete card read. Alternatively, an individual will not be able to retrieve their card because not enough of the card 48 will remain accessible in the notch 50 upon full insertion.

Strategically positioning and sizing the notch 50 provides enhanced safety in this example. An individual who attempts to gain access to a vestibule, for example, will not be able to fully insert their card because of the presence of a skimming reader that reduces any dimension of the notch 50. Failure to achieve full insertion of the card 48 results in the inability of the electronic reader 60 to properly read the card 48. When the individual is not able to gain access to that vestibule, that provides an indication that something is wrong. After several customer complaints, for example, the bank will be prompted to check the card reader housing 20 and could at that time discover the presence of the skimming reader.

Moreover, if one does not gain access to the vestibule, they will not enter their personal identification number (PIN) into the ATM and, therefore, the potential thief who has placed a skimming reader on the vestibule entry card reader, which may obtain its own full read even if the reader 60 does not, will not be able to gain access to the PIN number and will not be able to use any card information extracted by the skimming reader.

The illustrated example includes various features that provide enhanced safety and security for preventing unauthorized capturing of personal or banking information using a skimming reader, for example. The illustrated example includes a combination of security features. Any one of these, all of them or a sub-combination of them may provide sufficient security for a given situation. Those skilled in the art who have the benefit of this description will be able to select from an asymmetric surface configuration, a non-continuous surface configuration, a strategically dimensioned and positioned notch or a combination of these features to meet the needs of their particular situation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A card reading device, comprising:
a housing having a slot for receiving a card in a direction of entry into the slot and an asymmetric exterior surface that defines an entry to the slot that includes at least three distinct surface portions aligned at respective, different oblique angles that are each oblique relative to a reference plane that is perpendicular to the direction of entry into the slot, the asymmetric exterior surface that defines the entry to the slot having a configuration that is different on opposite sides of the slot and different above and below the slot such that the asymmetric exterior surface is asymmetric in more than one direction relative to the slot.

2. The device as recited in claim 1, comprising a notch associated with the slot, the notch having a depth beyond a first plane and a dimension sized for receiving at least a portion of a finger holding a card inserted into the slot.

3. The device as recited in claim 2, wherein the exterior surface is at least partially disposed within the first plane such that a trailing edge of the card inserted into the slot passes the first plane a sufficient distance such that the portion of the finger is received in the notch and the card is accessible from outside of the housing only at the notch.

4. The device as recited in claim 3, comprising an electronic reader directly in line with the notch along the direction of entry for reading a machine readable portion of the card inserted into the slot when the card is received at least a desired distance into the slot.

5. The device as recited in claim 1, wherein at least one of the surface portions lies in a first plane that intersects the reference plane along a first line and at least one other of the surface portions lies in a second plane that intersects the reference plane along a second line that is transverse to the first line.

6. The device as recited in claim 5, wherein the first line is perpendicular to the second line.

7. The device as recited in claim 1, wherein the asymmetric exterior surface is asymmetric about a first axis that is parallel to the slot and asymmetric about a second axis that is perpendicular to the first axis.

8. The device as recited in claim 1, wherein the asymmetric exterior surface is non-continuous having distinct planar surface portions with visible transition points between the surface portions.

9. The device as recited in claim 1, wherein the configuration on one side of the slot is not a mirror image of the configuration on an opposite side of the slot.

10. A card reading device, comprising:
a housing having an exterior surface at least partially in a plane;
a notch that has a depth beyond the plane and a dimension for receiving at least a portion of a finger;
a slot at least partially within the housing for receiving a card and having a first portion aligned with the notch and a second portion adjacent to the notch; and
an electronic reader directly aligned with the notch in a direction of card insertion into the slot such that when a card is inserted within the slot, some of the card is covered by some of the housing aligned with the second portion of the slot and another portion of the card including a machine readable portion is covered by some of the housing aligned with the first portion of the slot and the electronic reader, while another portion of the card that includes the machine readable portion remains accessible from outside the housing at the notch.

11. The device as recited in claim 10, wherein the electronic reader reads the machine readable portion of the card in response to a trailing edge of the card passing the plane a sufficient distance to provide a complete read of the machine readable portion.

12. The device as recited in claim 11, wherein the electronic reader determines when the trailing edge of the card does not pass the plane a sufficient distance to provide a complete read and provides an alert indication in response to a number of incomplete reads that exceeds a threshold.

13. The device as recited in claim 10, wherein the exterior surface of the housing is at least one of non-continuous or asymmetric.

14. The device as recited in claim 13, wherein the exterior surface includes a plurality of flat surface portions aligned at oblique angles relative to each other.

15. The device as recited in claim 10 wherein the dimension of the notch corresponds to a single human finger width.

16. The device as recited in claim 10, wherein the exterior surface includes at least three distinct surface portions at three different oblique angles, respectively, relative to a reference plane that is perpendicular to the direction of card insertion into the slot.

17. The device as recited in claim 10, wherein the asymmetric exterior surface is asymmetric about a first axis that is parallel to the slot and asymmetric about a second axis that is perpendicular to the first axis.

* * * * *